(12) United States Patent
Aoyama

(10) Patent No.: US 11,729,335 B2
(45) Date of Patent: Aug. 15, 2023

(54) IMAGE READING APPARATUS TO MANAGE TRANSMISSION DESTINATION OF INPUT IMAGE

(71) Applicant: PFU LIMITED, Kahoku (JP)

(72) Inventor: Katsunori Aoyama, Kahoku (JP)

(73) Assignee: PFU LIMITED, Kahoku (JP)

(\*) Notice: Subject to any disclaimer, the term of this patent is extended or adjusted under 35 U.S.C. 154(b) by 0 days.

(21) Appl. No.: 17/650,818

(22) Filed: Feb. 11, 2022

(65) Prior Publication Data

US 2022/0303430 A1   Sep. 22, 2022

(30) Foreign Application Priority Data

Mar. 17, 2021 (JP) ................... 2021-043622

(51) Int. Cl.
*H04N 1/00* (2006.01)
*H04N 1/32* (2006.01)

(52) U.S. Cl.
CPC ..... *H04N 1/32539* (2013.01); *H04N 1/00217* (2013.01); *H04N 1/32545* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 8,427,676 | B2 * | 4/2013 | Liou | G06F 3/1268 |
| | | | | 710/305 |
| 2005/0141564 | A1 * | 6/2005 | Kang | H04N 1/00411 |
| | | | | 370/495 |
| 2008/0077725 | A1 * | 3/2008 | Yabuki | H04N 1/32667 |
| | | | | 710/305 |
| 2010/0167651 | A1 * | 7/2010 | Sakuda | H04W 76/36 |
| | | | | 455/41.2 |

(Continued)

FOREIGN PATENT DOCUMENTS

| | | | | |
|---|---|---|---|---|
| JP | 2008022170 | * | 1/2008 | ............ H04N 1/00 |
| JP | 2009130850 | * | 6/2009 | ............ H04N 1/00 |

(Continued)

*Primary Examiner* — Beniyam Menberu
(74) *Attorney, Agent, or Firm* — Lewis Roca Rothgerber Christie LLP

(57) ABSTRACT

An image reading apparatus includes a first communication device provided communicatively with a first information processing apparatus, a second communication device provided communicatively with a second information processing apparatus, and a processor to receive a setting for a transmission destination of an input image, prohibit transmission of the input image via the second communication device when the first information processing apparatus that can communicate via the first communication device is set as the transmission destination of the input image, determine whether the first communication device is in a state physically communicable with a network. The processor permits transmission of the input image via the second communication device when the first information processing appara- (Continued)

tus is set as the transmission destination of the input image and it is determined that the first communication device is not in a state physically communicable with the network.

18 Claims, 8 Drawing Sheets

(56) References Cited

U.S. PATENT DOCUMENTS

| | | | |
|---|---|---|---|
| 2014/0184516 A1* | 7/2014 | Kim | G06F 3/0231 345/169 |
| 2017/0164287 A1* | 6/2017 | Ozawa | H04W 4/80 |
| 2018/0278576 A1* | 9/2018 | Ohara | G06F 3/1236 |
| 2019/0132457 A1* | 5/2019 | Sako | H04L 69/14 |
| 2020/0220985 A1* | 7/2020 | Keery | G06F 3/0482 |

FOREIGN PATENT DOCUMENTS

| | | | | |
|---|---|---|---|---|
| JP | 2011-10080 A | 1/2011 | | |
| JP | 2012-190092 A | 10/2012 | | |
| JP | 2013-47994 A | 3/2013 | | |
| JP | 2019205058 | * 11/2019 | | H04L 12/28 |

\* cited by examiner

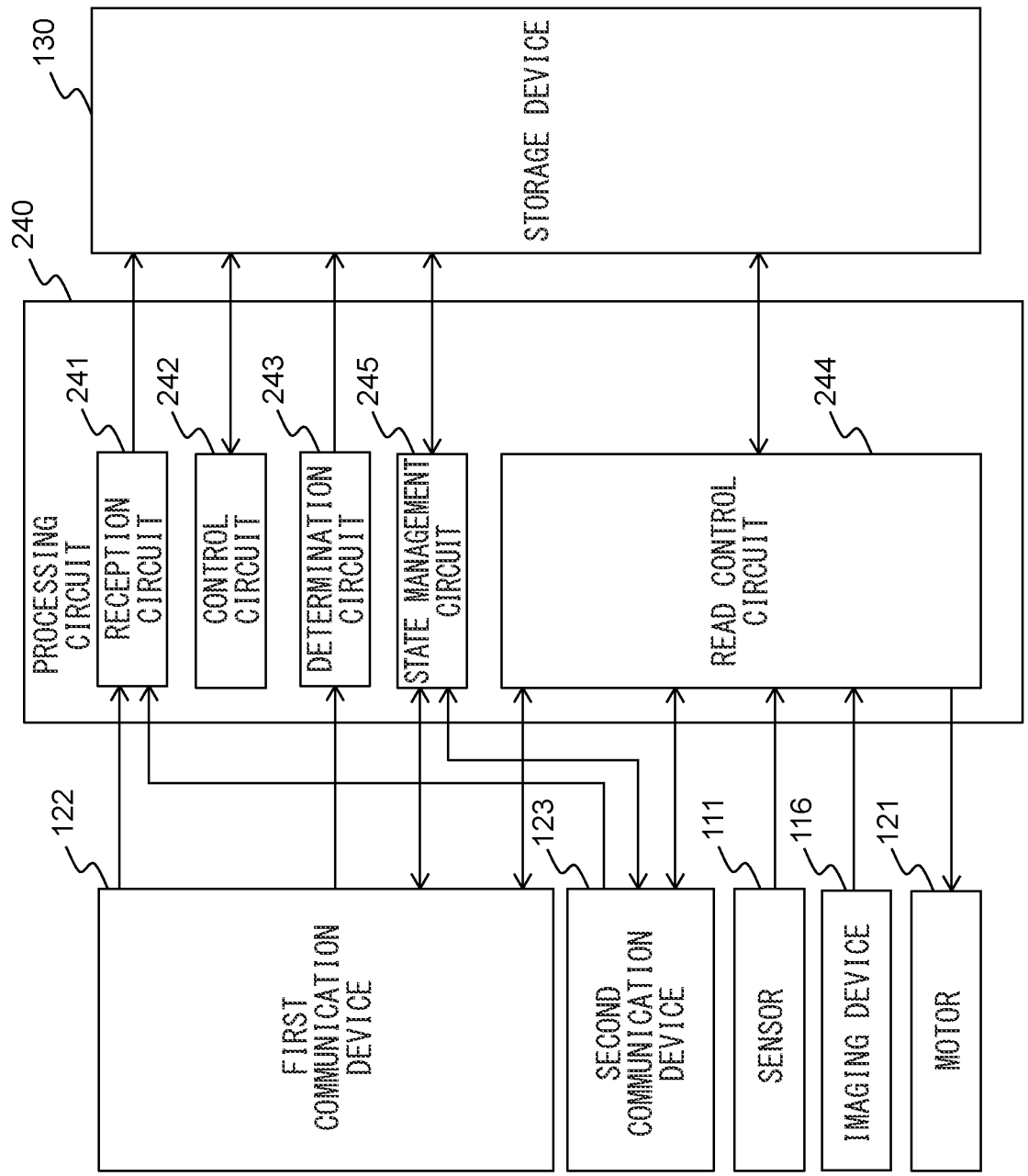

IMAGE READING APPARATUS TO MANAGE TRANSMISSION DESTINATION OF INPUT IMAGE

CROSS-REFERENCE TO RELATED APPLICATIONS

This application is based upon and claims the benefit of priority of prior Japanese Patent Application No. 2021-043622, filed on Mar. 17, 2021, the entire contents of which are incorporated herein by reference.

TECHNICAL FIELD

Embodiments discussed in the present specification relate to transmission of an image.

BACKGROUND

An image reading apparatus, such as a scanner, transmits an input image acquired by imaging a medium to an information processing apparatus, such as a server or a personal computer, so that the input image is appropriately managed. In recent years, it is often the case that one image reading apparatus is used in various applications, and the image reading apparatus is provided communicatively with a plurality of information processing apparatuses so that a transmission destination of the input image can be changed according to the application. In the image reading apparatus, the transmission destination of the input image is required to be appropriately managed, when the image reading apparatus communicates with a plurality of information processing apparatuses.

A device utilization system available both via a peripheral device interface and via a device server is disclosed (Japanese Unexamined Patent Publication (Kokai) No. 2012-190092). While a device is used in one communication path, the device utilization system does not immediately switch the one communication path even when a connection is made to the other communication path. In that case, the device utilization system inquires of the PC using the communication path whether to switch, and switches the communication path only when permitted.

A peripheral device which can perform data communication with a host device using either a first type of interface or second type whose specifications relating to data communication are different from each other, is disclosed (Japanese Unexamined Patent Publication (Kokai) No. 2013-47994). The peripheral device forms a logical connection with the host device using either the first kind of interface or the second kind of interface, and disconnects the formed logical connection and forms a logical connection again with the host device while maintaining physical connection.

An image processing apparatus including a network communication function is disclosed (Japanese Unexamined Patent Publication (Kokai) No. 2011-10080). In the image processing apparatus, a storage device having the network communication function is detachable. When the image processing apparatus detects that the storage device is connected, the image processing apparatus changes a network setting relating to the network communication function of the image processing apparatus to enable communication with the storage device.

SUMMARY

According to some embodiments, an image reading apparatus includes an imaging device to generate an input image acquired by imaging a medium, a first communication device provided communicatively with a first information processing apparatus, a second communication device provided communicatively with a second information processing apparatus, and a processor to receive a setting for a transmission destination of the input image, prohibit transmission of the input image via the second communication device when the first information processing apparatus that can communicate via the first communication device is set as the transmission destination of the input image, determine whether the first communication device is in a state physically communicable with a network. The processor permits transmission of the input image via the second communication device when the first information processing apparatus is set as the transmission destination of the input image and it is determined that the first communication device is not in a state physically communicable with the network.

According to some embodiments, a method for controlling an image reading apparatus, includes, generating an input image acquired by imaging a medium, by an imaging device, receiving a setting for a transmission destination of the input image, prohibiting transmission of the input image via a second communication device provided communicatively with a second information processing apparatus when a first information processing apparatus that can communicate via a first communication device provided communicatively with the first information processing apparatus is set as the transmission destination of the input image, and determining whether the first communication device is in a state physically communicable with a network. Transmission of the input image via the second communication device is permitted when the first information processing apparatus is set as the transmission destination of the input image and it is determined that the first communication device is not in a state physically communicable with the network.

According to some embodiments, a computer-readable, non-transitory medium stores a computer program. The computer program causes an image reading apparatus including an imaging device to generate an input image acquired by imaging a medium, a first communication device provided communicatively with a first information processing apparatus, a second communication device provided communicatively with a second information processing apparatus, to execute a process including receiving a setting for a transmission destination of the input image, prohibiting transmission of the input image via the second communication device when the first information processing apparatus that can communicate via the first communication device is set as the transmission destination of the input image, determining whether the first communication device is in a state physically communicable with a network. Transmission of the input image via the second communication device is permitted when the first information processing apparatus is set as the transmission destination of the input image and it is determined that the first communication device is not in a state physically communicable with the network.

BRIEF DESCRIPTION OF DRAWINGS

FIG. 8 is a diagram illustrating a schematic configuration of another processing circuit 240.

DESCRIPTION OF EMBODIMENTS

It is to be understood that both the foregoing general description and the following detailed description are exemplary and explanatory, and are not restrictive of the invention, as claimed.

Hereinafter, an image reading apparatus, a method for controlling an image reading apparatus, and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
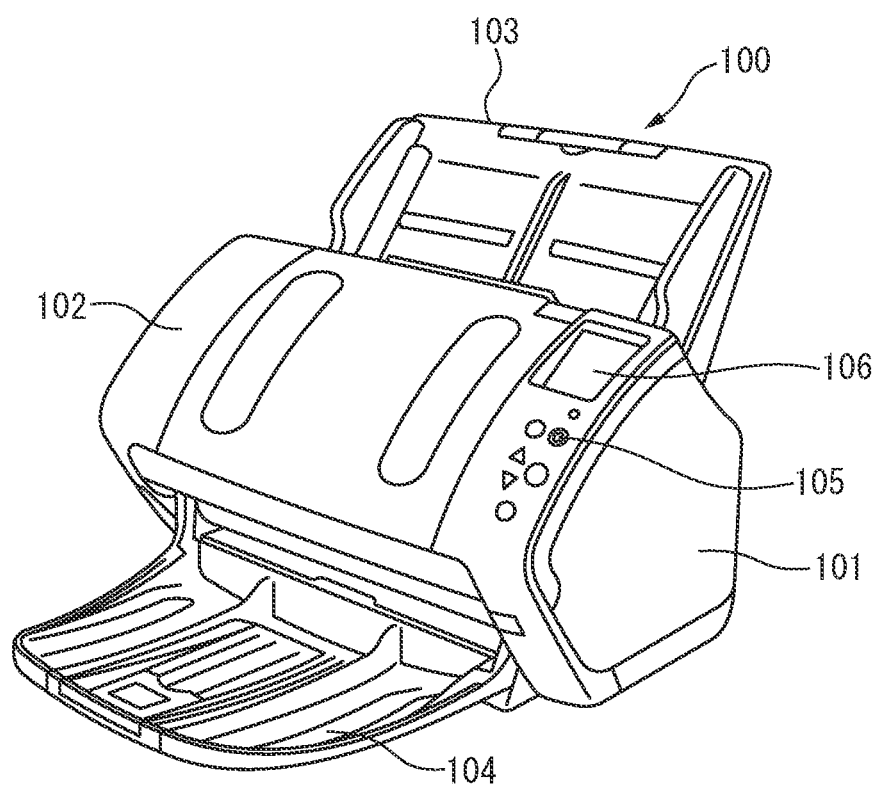
FIG. 1 is a perspective view illustrating an image reading apparatus 100 according to an embodiment.

FIG. 1 is a perspective view illustrating an image reading apparatus 100 configured as an image scanner.

The image reading apparatus 100 conveys and images a medium being a document. A medium is a paper, a thick paper, a card, a brochure, a passport, etc. The image reading apparatus 100 may be a facsimile, a copying machine, a printer multifunction machine (MFP, Multifunction Peripheral), etc. The image reading apparatus 100 may be an apparatus having an imaging function and a communication function, and may be a mobile phone, a personal computer, etc.

The image reading apparatus 100 includes a lower housing 101, an upper housing 102, a medium tray 103, an ejection tray 104, an operation device 105, and a display device 106, etc.

The upper housing 102 is located at a position covering the upper surface of the image reading apparatus 100 and is engaged with the lower housing 101 by hinges so as to be opened and closed at a time of medium jam, during cleaning the inside of the image reading apparatus 100, etc.

The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user.

The display device 106 is an example of a display device, and includes a display including a liquid crystal or organic electro-luminescence (EL), and an interface circuit for outputting image data to the display, and displays the image data on the display.

Figure 2:
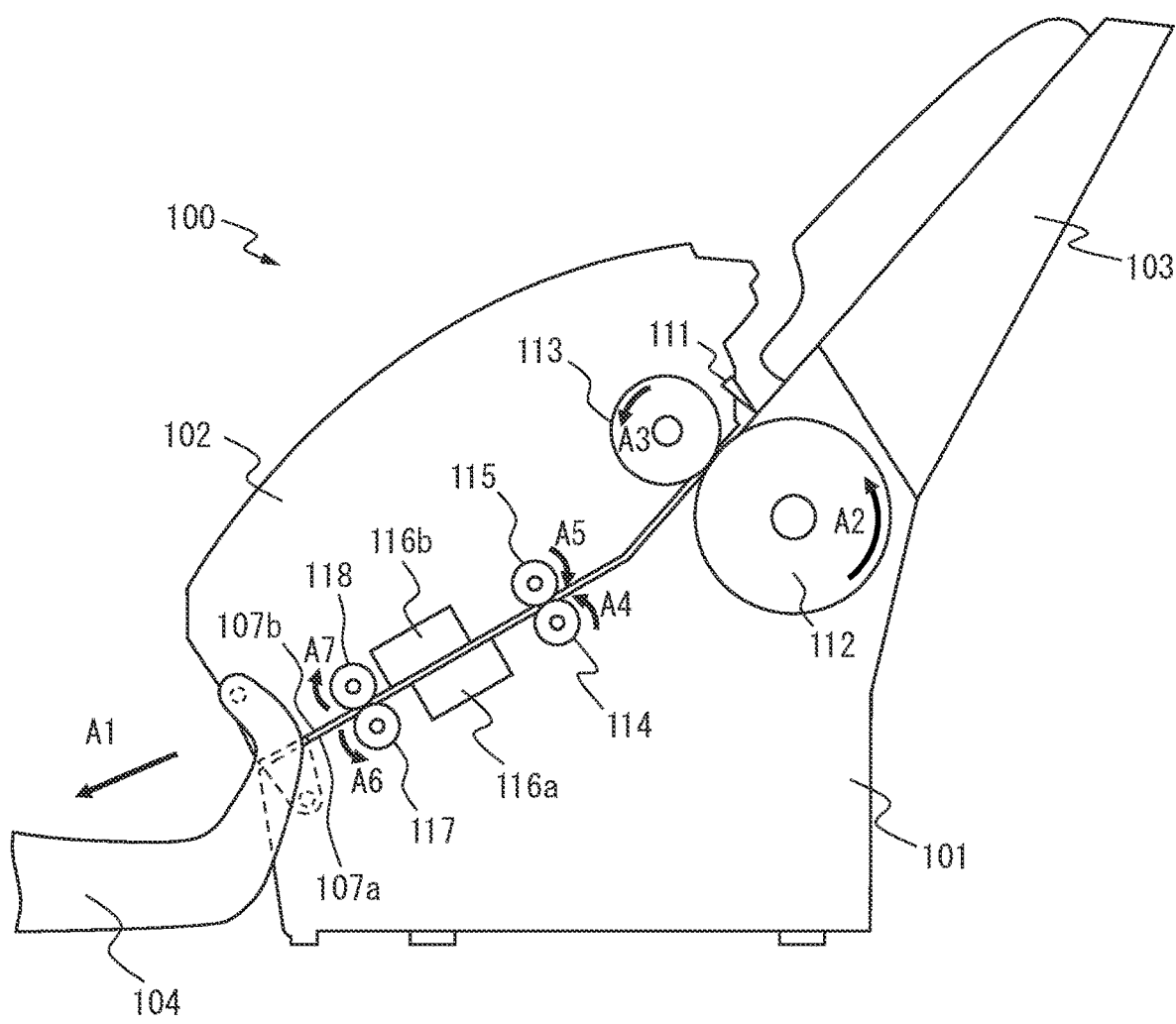
FIG. 2 is a diagram for illustrating a conveyance path inside the image reading apparatus 100.

FIG. 2 is a diagram for illustrating a conveyance path inside the image reading apparatus 100.

The conveyance path inside the image reading apparatus 100 includes a sensor 111, a feed roller 112, a brake roller 113, a first conveyance roller 114, a second conveyance roller 115, a first imaging device 116a, a second imaging device 116b, a third conveyance roller 117 and a fourth conveyance roller 118, etc. The numbers of each roller is not limited to one, and may be plural.

Atop surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. Hereinafter, an upstream refers to an upstream in the medium conveying direction A1, and a downstream refers to a downstream in the medium conveying direction A1.

The sensor 111 is located on the upstream side of the feed roller 112 and the brake roller 113. The sensor 111 includes a contact detection sensor, and detects whether or not a medium is placed on the medium tray 103. The sensor 111 generates and outputs a medium signal whose signal value changes in a state where the medium is placed on the medium tray 103 and a state where the medium is not placed.

The first imaging device 116a includes a line sensor based on a unity-magnification optical system type contact image sensor (CIS) including an imaging element based on a complementary metal oxide semiconductor (CMOS) linearly located in a main scanning direction. Further, the first imaging device 116a includes a lens for forming an image on the imaging element, and an A/D converter for amplifying and analog-digital (A/D) converting an electric signal output from the imaging element. The first imaging device 116a generates and outputs an input image acquired by imaging a front surface of the conveyed medium.

Similarly, the second imaging device 116b includes a line sensor based on a unity-magnification optical system type CIS including an imaging element based on a CMOS linearly located in a main scanning direction. Further, the second imaging device 116b includes a lens for forming an image on the imaging element, and an A/D converter for amplifying and A/D converting an electric signal output from the imaging element. The second imaging device 116b generates and outputs an input image acquired by imaging a back surface of the conveyed medium.

Only either of the first imaging device 116a and the second imaging device 116b may be located in the image reading apparatus 100 and only one side of a medium may be read. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs may be used. Hereinafter, the first imaging device 116a and the second imaging device 116b may be collectively referred to as an imaging device 116. The imaging device 116 is an example of imaging module.

A medium placed on the medium tray 103 is conveyed between the lower guide 107a and the upper guide 107b in the medium conveying direction A1 by the feed roller 112 rotating in a direction of an arrow A2 in FIG. 2, i.e., a medium feeding direction. When the medium is conveyed, the brake roller 113 rotates in a direction of an arrow A3, i.e., a direction opposite to the medium feeding direction. By the workings of the feed roller 112 and the brake roller 113, when a plurality of media are placed on the medium tray 103, only a medium in contact with the feed roller 112, out of the media placed on the medium tray 103, is separated. Consequently, the image reading apparatus 100 operates in such a way that conveyance of a medium other than the separated medium is restricted (prevention of multi-feed).

The medium is fed between the first conveyance roller 114 and the second conveyance roller 115 while being guided by the lower guide 107a and the upper guide 107b. The medium is fed between the first imaging device 116a and the second imaging device 116b by the first conveyance roller 114 and the second conveyance roller 115 rotating in directions of an arrow A4 and an arrow A5, respectively. The medium read by the imaging devices 116 is ejected on the ejection tray 104 by the third conveyance roller 117 and the fourth conveyance roller 118 rotating in directions of an arrow A6 and an arrow A7, respectively.

Figure 3:
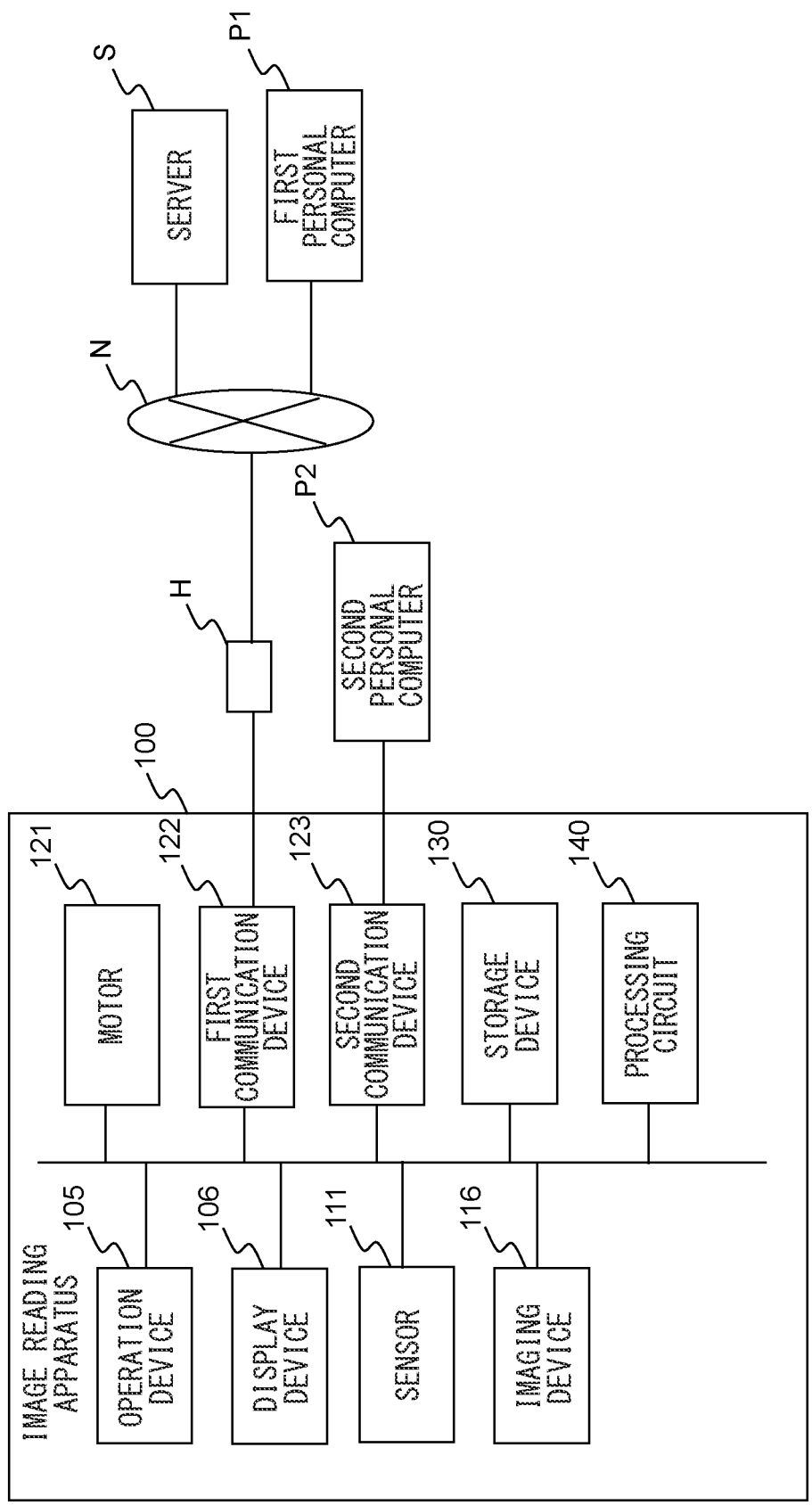
FIG. 3 is a block diagram illustrating a schematic configuration of the image reading apparatus 100.

FIG. 3 is a block diagram illustrating a schematic configuration of the image reading apparatus 100.

The image reading apparatus 100 further includes a motor 121, a first communication device 122, a second communication device 123, a storage device 130, a processing circuit 140, etc., in addition to the configuration described above.

The motor 121 includes one or more motors. The motor 121 conveys the medium by rotating the feed roller 112, the brake roller 113, the first conveyance roller 114, the second conveyance roller 115, the third conveyance roller 117, and the fourth conveyance roller 118 by a control signal from the processing circuit 140.

The first communication device 122 is an example of a first communication module. The first communication device 122 includes a wired communication interface circuit according to a communication protocol such as TCP/IP (Transmission Control Protocol/Internet Protocol). The first communication device 122 is physically connected to a relay device H such as a switching hub or a repeater hub, by a wired cable such as a LAN (Local Area Network) cable. The first communication device 122 communicates with (is connected to) a network N such as an intranet or an Internet, in accordance with a communication standard such as Ethernet (registered trademark), via the relay device H. The first communication device 122 supplies data received from an information processing apparatus communicatively connected via the network N to the processing circuit 140, and transmits data supplied from the processing circuit 140 to the information processing apparatus communicatively connected via the network N.

The first communication device 122 constantly monitors whether the first communication device 122 is link-up or link-down. That is, the first communication device 122 constantly monitors whether the wired cable is inserted into the image reading apparatus 100 and the relay device H, or is removed from the image reading apparatus 100 or the relay device H. The first communication device 122 determines that the first communication device 122 is in a state physically communicable with the network N when the first communication device 122 is link-up. On the other hand, the first communication device 122 determines that the first communication device 122 is not in a state physically communicable with the network N when the first communication device 122 is link-down. The first communication device 122 transmits a state signal indicating whether or not the first communication device 122 is in a state physically communicable with the network N to the processing circuit 140.

The network N is connected to an information processing apparatus such as a server S and a first personal computer P1, and the first communication device 122 is provided communicatively connected with each information processing apparatus via the network N. Server S is an example of the first information processing apparatus.

The first communication device 122 may be any device, as long as it can communicate with other devices. For example, the first communication device 122 may have an antenna for transmitting and receiving a wireless signal, and a wireless communication interface circuit according to a communication protocol such as a wireless LAN. In this case, the first communication device 122 wirelessly establishes a communication connection with an access point of the wireless LAN, and is connected to the network N via an access point.

The first communication device 122 constantly monitors whether wireless communication with the access point is established or disconnected. The first communication device 122 determines that the first communication device 122 is in a state physically communicable with the network N when wireless communication with the access point is established. On the other hand, the first communication device 122 determines that the first communication device 122 is not in a state physically communicable with the network N when wireless communication with the access point is disconnected. The first communication device 122 transmits a state signal indicating whether the first communication device 122 is in a state physically communicable with the network N to the processing circuit 140.

The first communication device 122 may include an interface circuit according to a serial bus such as a USB (Universal Serial Bus), and may be provided communicatively with the information processing apparatus via a wired cable such as a USB cable.

The second communication device 123 is an example of a second communication module. The second communication device 123 includes an interface circuit according to a serial bus such as a USB (Universal Serial Bus). The second communication device 123 is connected to an information processing apparatus such as a second personal computer P2, via a wired cable such as a USB cable, and is provided communicatively with the connected information processing apparatus. The second personal computer P2 is an example of a second information processing apparatus. The second communication device 123 supplies data received from the communicatively connected information processing apparatus to the processing circuit 140, and transmits data supplied from the processing circuit 140 to the communicatively connected information processing apparatus.

The second communication device 123 may be any device, as long as it can communicate with other devices. For example, the second communication device 123 may include a wired communication interface circuit in accordance with a communication protocol such as a TCP/IP, or a wireless communication interface circuit in accordance with a communication protocol such as a wireless LAN, and may be communicatively connected to the information processing apparatus via a network.

The storage device 130 includes a memory device such as a random access memory (RAM) or a read only memory (ROM), a fixed disk device such as a hard disk, or a portable storage device such as a flexible disk or an optical disk. The storage device 130 stores computer programs, databases, tables, etc., used for various kinds of processing of the image reading apparatus 100. The computer program may be installed on the storage device 130 from a computer-readable, non-transitory medium such as a compact disc read only memory (CD-ROM), a digital versatile disc read only memory (DVD-ROM), etc., by using a well-known setup program, etc.

The storage device 130 stores a setting of a transmission destination of the input image, and a prohibition flag, etc., as data. The transmission destination of the input image is set from the communicatively connected information processing apparatus, and an initial value of the transmission destination of the input image is set to blank. The prohibition flag is a flag indicating whether or not the transmission of the input image via the second communication device 123 is prohibited, the initial value of the prohibition flag is set to OFF (permit).

The processing circuit 140 operates in accordance with a program previously stored in the storage device 130. The processing circuit 140 is, for example, a CPU (Central Processing Unit). The processing circuit 140 may be a digital signal processor (DSP), a large scale integration (LSI), an application specific integrated circuit (ASIC), a field-programmable gate array (FPGA), etc.

The processing circuit 140 is connected to the operation device 105, the display device 106, the sensor 111, the imaging device 116, the motor 121, the first communication device 122, the second communication device 123 and the storage device 130, etc., and controls these units. The processing circuit 140 performs control of the operation device 105, display control of the display device 106, etc., and receives a request from the user. Further, the processing circuit 140 performs drive control of the motor 121 and imaging control of the imaging device 116 in accordance with the output signal from the sensor 111, acquires an input image, and transmits it to the information processing apparatus via the first communication device 122 or the second communication device 123.

Figure 4:
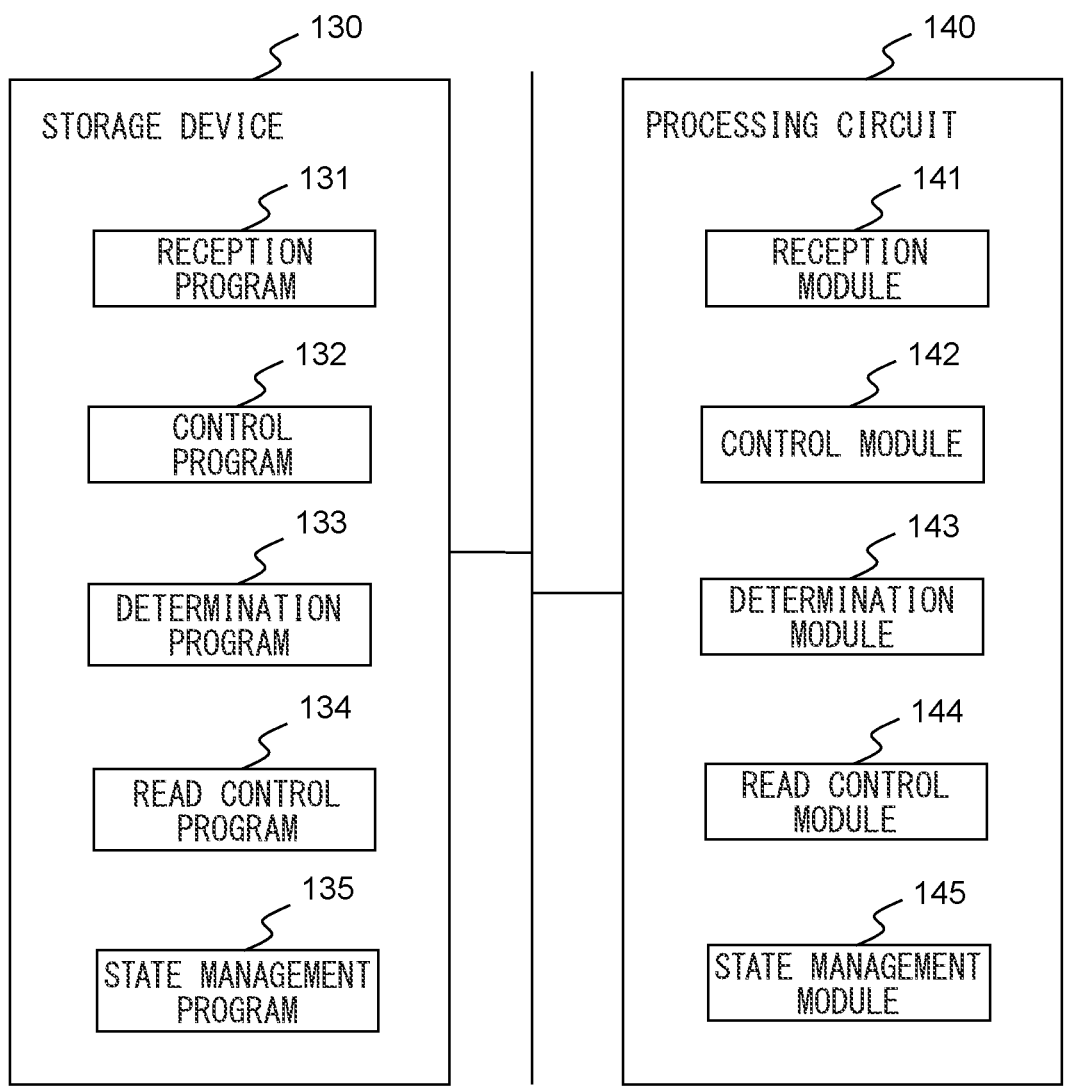
FIG. 4 is a diagram illustrating schematic configurations of a storage device 130 and a processing circuit 140.

FIG. 4 is a diagram illustrating schematic configurations of the storage device 130 and the processing circuit 140.

As illustrated in FIG. 4, the storage device 130 stores a reception program 131, a control program 132, a determination program 133, a read control program 134, a state management program 135, etc. Each of these programs is a functional module implemented by software operating on a processor. The processing circuit 140 reads each program stored in the storage device 130 and operates in accordance with each read program. Thus, the processing circuit 140 functions as the reception module 141, the control module 142, the determination module 143, the read control module 144, and the state management module 145.

Figure 5:
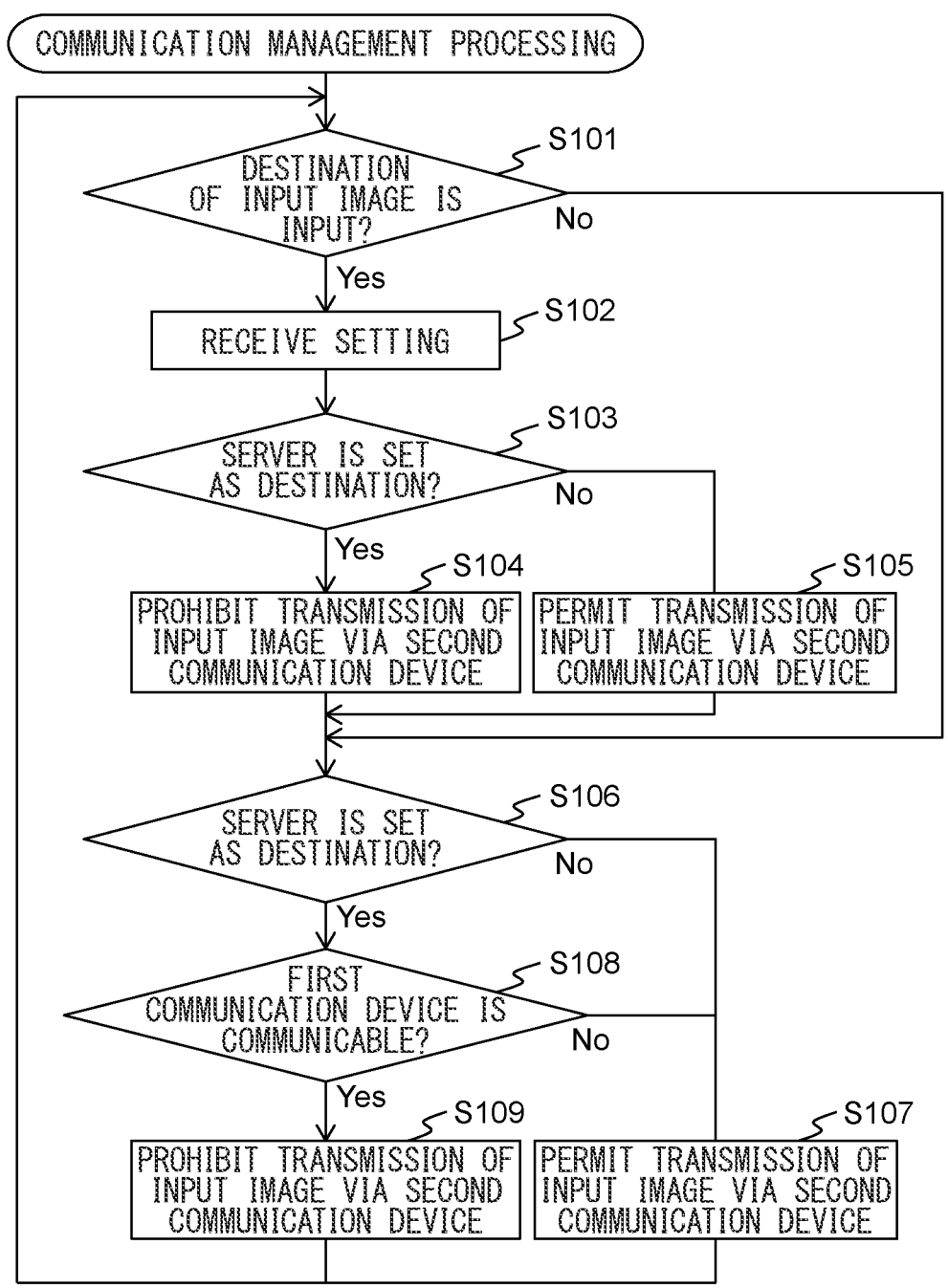
FIG. 5 is a flowchart illustrating an operation example of a communication management processing.

FIG. 5 is a flowchart illustrating an example of the operation of the communication management processing of the image reading apparatus 100.

Hereinafter, an example of the operation of the communication management process of the image reading apparatus 100 will be described with reference to a flowchart illustrated in FIG. 5. The flow of the operation described below is executed mainly by the processing circuit 140 in cooperation with each element of the image reading apparatus 100 based on a program stored in the storage device 130 in advance.

First, the reception module 141 determines whether or not the setting of the transmission destination of the input image has been input (step S101). The server S, the first personal computer P1, the second personal computer P2, or the like is set as the transmission destination of the input image. For example, the transmission destination of the input image may be set in conjunction with the setting for enabling/disabling the server cooperation function that centrally manages the input image generated by the one or more image reading apparatuses 100 by the server S. In this case, when the server cooperation function is enabled, the server S is set as the destination of the input image, and when the server cooperation function is disabled, it is set to be a personal computer other than the server S as the destination of the input image. The setting of the transmission destination of the input image is input by receiving, for example, from the server S, the first personal computer P1, or the second personal computer P2 through the first communication device 122 or the second communication device 123. The setting of the transmission destination of the input image may be input from the user using the operation device 105. If the setting of the transmission destination of the input images is not newly input, the reception module 141 shifts the process to the step S106.

On the other hand, when the setting of the transmission destination of the input image is input, the reception module 141 receives the setting of the transmission destination of the input image and stores the set transmission destination of the input image in the storage device 130 (step S102).

Next, the control module 142 determines whether or not the server S that can communicate via the first communication device 122 is set as the transmission destination of the input image (step S103).

The control module 142 prohibits transmission of the input image through the second communication device 123 by setting the prohibition flag stored in the storage device 130 to ON when the server S that can communicate via the first communication device 122 is set as the transmission destination of the input image (step S104). The control module 142 prohibits only transmission of the input image via the second communication device 123 and permits transmission and reception of setting information or state information of the image reading apparatus 100 via the second communication device 123.

On the other hand, the control module 142 permits the transmission of the input image via the second communication device 123 by setting the prohibition flag stored in the storage device 130 to OFF when an apparatus other than the server S is set as the transmission destination of the input image (step S105).

As will be described later, the image reading apparatus 100 prohibits the transmission of the input image to an apparatus other than the server S when the server cooperation function is enabled and the server S is set as the transmission destination of the input image. Thus, the image reading apparatus 100 can prevent the input image from being transmitted to an apparatus other than the server S and the server S from being unable to manage the input image when the user accidentally controls from the apparatus other than the server S while the server cooperation function is enabled.

Next, the control module 142 reads the transmission destination of the input image from the storage device 130 and determines whether or not the server S that can communicate via the first communication device 122 is set as the transmission destination of the input image (step S106).

The control module 142 permits transmission of the input image via the second communication device 123 when an apparatus other than the server S is set as the transmission destination of the input image (step S107). In this case, since the prohibition flag has already been set to OFF (permit), the control module 142 permits the transmission of the input image via the second communication device 123, without changing the prohibition flag.

On the other hand, the determination module 143 determines whether or not the first communication device 122 is in a state physically communicable with the network N when the server S is set as the transmission destination of the input image (step S108). The determination module 143 acquires the state signal from the first communication device 122, and determines whether or not the first communication device 122 is in a state physically communicable with the network N, depending on whether or not the state signal indicates that the first communication device 122 is in a state physically communicable with the network N. That is, if the first communication device 122 is connected to the network N by the wired cable, the determination module 143 determines that the first communication device 122 is not in a state physically communicable with the network N when the wired cable is removed from the image reading apparatus 100. Further, if the first communication device 122 is connected to the network N by wireless, the determination module 143 determines that the first communication device 122 is not in a state physically communicable with the network N when the wireless communication with the network N is disconnected.

When it is determined that the first communication device 122 is not in a state physically communicable with the network N by the determination module 143, the control module 142 permits the transmission of the input image via the second communication device 123, by setting the first prohibition flag to OFF (step S107).

In this way, the control module 142 permits the transmission of the input image via the second communication device 123 when the server S is set as the transmission destination of the input image and it is determined that the first communication device 122 is not in a state physically communicable with the network N. When the server S is set as the transmission destination of the input image and the server S or the communication path with the server S is unavailable for some reason, the user cannot use the image reading apparatus 100 itself. Normally, the user needs to change the setting of the transmission destination of the input image to an apparatus other than the server S in the image reading apparatus in order to use the image reading apparatus. In the image reading apparatus 100, the user can easily recover the image reading apparatus 100 to a state where the image reading apparatus 100 is available using an apparatus other than server S, by removing the wired cable from the image reading apparatus 100 or by turning off the power of the access point of the wireless LAN. Therefore, the image reading apparatus 100 can improve the convenience of the user.

On the other hand, when it is determined that the first communication device 122 is in a state physically communicable with the network N by the determination module 143, the control module 142 prohibits the transmission of the input image via the second communication device 123, by setting the prohibition flag to ON (step S109).

Therefore, the control module 142 prohibits the transmission of the input image via the second communication device 123 again when the server S is set as the transmission destination of the input image, and it is determined that the first communication device 122 is in a state physically communicable with the network after it is determined that the first communication device 122 is not in a state physically communicable with the network N. Thus, when the server S or the communication path with the server S is recovered to be available, the user can easily recover the server cooperation function by re-inserting the wired cable into the image reading apparatus 100 or starting the power of the access point. Therefore, the image reading apparatus 100 can improve the convenience of the user.

In step S109, the control module 142 prohibits only transmission of the input image via the second communication device 123, and permits transmission or reception of the setting information or the state information of the image reading apparatus 100 via the second communication device 123. That is, the control module 142 permits transmission and reception of the setting information or the state information of the image reading apparatus 100 via the second communication device 123 regardless of whether or not it is determined that the first communication device 122 is in a state physically communicable with the network N.

Next, the control module 142 returns the process to step S101, and repeats the process in steps S101 to S109.

Figure 6:
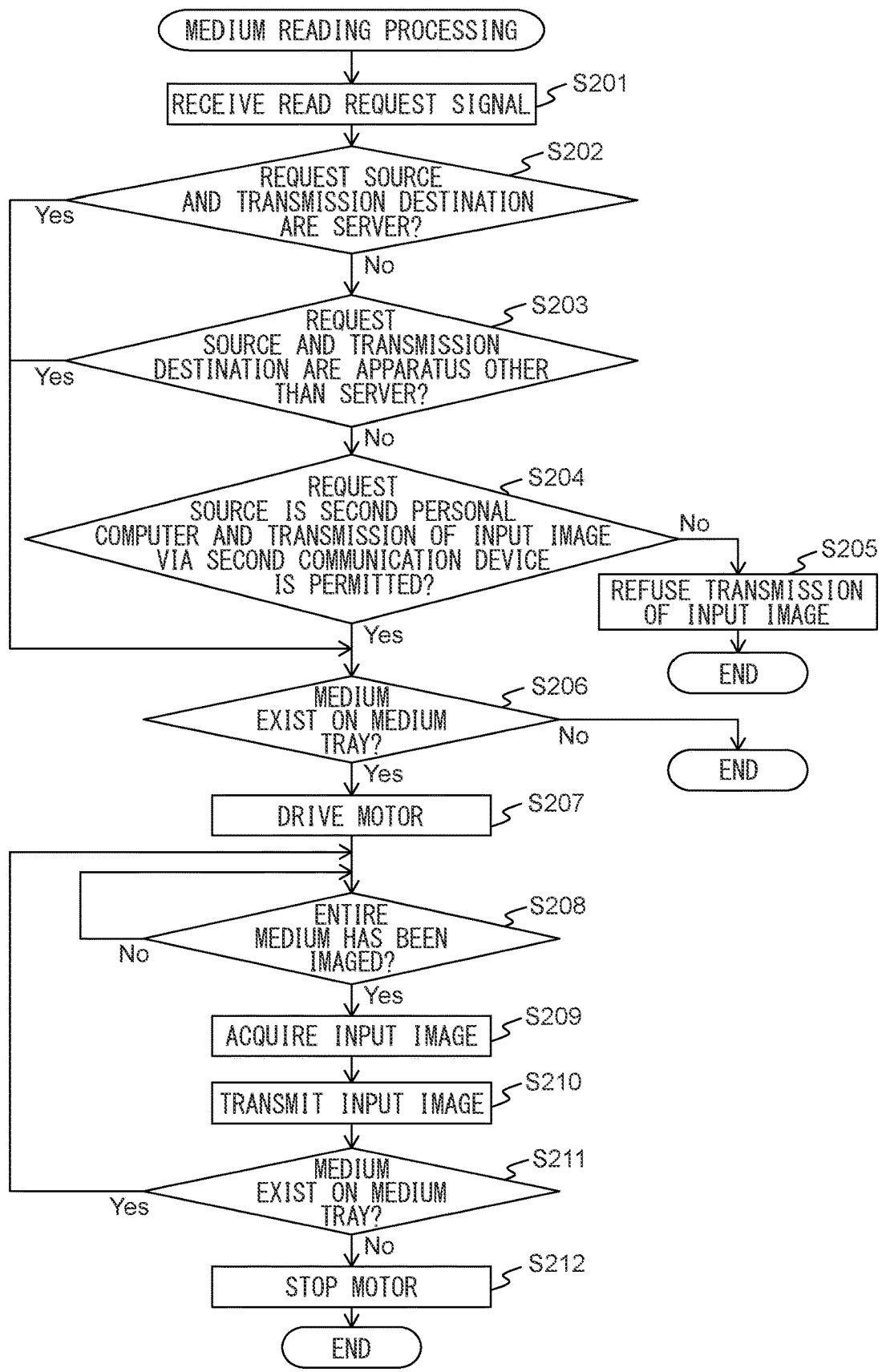
FIG. 6 is a flowchart illustrating an operation example of a medium reading processing.

FIG. 6 is a flowchart illustrating an operation example of a medium reading processing of the image reading apparatus 100.

Referring to the flowchart illustrated in FIG. 6, the operation example of the medium reading processing in the image reading apparatus 100 will be described below. The flow of the operation described below is executed mainly by the processing circuit 140 in cooperation with each element of the image reading apparatus 100 based on a program stored in the storage device 130 in advance. The operation flow illustrated in FIG. 6 is periodically executed.

First, the read control module 144 waits until it receives a read request signal for requesting reading of the medium (step S201). The read control module 144 receives the read request signal, for example, from the server S, the first personal computer P1 or the second personal computer P2 via the first communication device 122 or the second communication device 123.

The read request signal includes apparatus information indicating an apparatus which is the request source (server S, the first personal computer P1 or the second personal computer P2, etc.). The read request signal may also include a job. The job is a setting relating to a medium reading processing of the image reading apparatus 100, and is set for each type of the medium (general paper, business card, photograph, etc.) to be read by the image reading apparatus 100, for example. The job includes settings such as color setting of the generated input image (color/gray scale/black and white, etc.), resolution (200 dpi/300 dpi/600 dpi, etc.), and reading surface (both sides/one side). The job may be set in advance by a setting request signal to be described later.

Next, the read control module 144 determines whether or not both the request source of the read request signal and the transmission destination of the input image set in step S102 of FIG. 5 are the servers S (step S202). When both the request source of the read request signal and the set transmission destination of the input image are the servers S, the read control module 144 proceeds the process to step S206 and starts reading the medium.

On the other hand, when either the request source of the read request signal or the set transmission destination of the input image is not the server S, the read control module 144 determines whether both the request source of the read request signal and the set transmission destination of the input image are an apparatus other than the server S (step S203). When both the request source of the read request signal and the set transmission destination of the input image are apparatuses other than the server S, the read control module 144 proceeds the process to step S206 and starts reading the medium. The read control module 144 may further determine whether or not the request source of the read request signal matches the set transmission destination of the input image. In this case, the read control module 144 proceeds the process to step S206 and starts reading the medium only when the request source of the read request signal matches the set transmission destination of the input image.

On the other hand, when either the request source of the read request signal or the set transmission destination of the input image is the server S, the read control module 144 determines whether or not the request source of the read request signal is an apparatus (the second personal computer P2) that can communicate via the second communication device 123. Furthermore, the read control module 144 determines whether the transmission of the input images via the second communication device 123 is permitted or prohibited (step S204). The read control module 144 determines whether the transmission of the input image via the second communication device 123 is permitted or prohibited, according to whether the prohibition flag stored in the storage device 130 is set to OFF or ON.

When the request source of the read request signal is an apparatus that can communicate via the second communication device 123 and the transmission of the input image via the second communication device 123 is permitted, the read control module 144 proceeds the process to step S206 and starts reading the medium.

On the other hand, when the request source of the read request signal is not an apparatus that can communicate via the second communication device 123, or when the transmission of the input image via the second communication device 123 is prohibited, the read control module 144 refuses the transmission of the input image (step S205), and ends the series of steps. The read control module 144 notifies the user that the transmission of the input image is refused by displaying it on the display device 106 or by transmitting it to the apparatus which is the request source via the first communication device 122 or the second communication device 123.

That is, the read control module 144 executes reading of the medium when requested from the server S if the server cooperation function is enabled, and the read control module 144 executes reading of the medium when requested from an apparatus other than the server S if the server cooperation function is disabled. Otherwise, the read control module 144 refuses the reading of the medium in principle. However, when the request source is an apparatus that can communicate via the second communication device 123 and the transmission of the input image through the second communication device 123 is permitted, the read control module 144 executes the reading of the medium.

When the process proceeds to step S204 even though the request source is an apparatus that can communicate via the second communication device 123, i.e., an apparatus other than the server S in step S203, it is considered that the server cooperation function is enabled. Further, when the transmission of the input image via the second communication device 123 is permitted even though the server cooperation function is enabled, it is considered that the first communication device 122 is not in a state physically communicable with the network N. That is, the read control module 144 executes the reading of the medium when the reading of the medium is requested from an apparatus communicating with the second communication device 123 in a state the first communication device 122 is not in a state physically communicable with the network N even though the server cooperation function is enabled.

Next, the read control module 144 acquires the medium signal from the sensor 111, and determines whether or not the medium is placed on the medium tray 103 based on the acquired medium signal (step S206). When the medium is not placed on the medium tray 103, the read control module 144 ends the series of steps without executing the reading of the medium.

On the other hand, when the medium is placed on the medium tray 103, the read control module 144 drives the motor 121 to rotate the feed roller 112, the brake roller 113, the first to fourth conveyance rollers 114, 115, 117 and 118 to convey the medium (step S207). Further, the read control module 144 causes the imaging device 116 to start imaging the medium according to the specified job.

Next, the read control module 144 waits until the entire medium has been imaged (step S208). The read control module 144 determines that the entire medium has been imaged, for example, when a predetermined time has elapsed since the start of conveying the medium. A medium sensor to detect presence or absence of the medium may be located in the vicinity of the imaging device 116, the read control module 144 may determine whether or not the entire medium has been imaged based on an output signal from the medium sensor. In that case, the read control module 144 periodically acquires the output signal from the medium sensor, and determines that the rear end of the medium has passed through the position of the medium sensor when the output signal changes from a state indicating that the medium is present to a state indicating that the medium is not present. The read control module 144 determines that the rear end of the medium has passed through the imaging position of the imaging device 116 and the entire medium has been imaged when a predetermined time has elapsed since the rear end of the medium passes through the position of the medium sensor.

When the entire medium is imaged, the read control module 144 acquires the input image from the imaging device 116 (step S209).

Next, the read control module 144 transmits the acquired input images to an apparatus which is the request source via the first communication device 122 or the second communication device 123 (step S210). When the apparatus which is the request source is an apparatus that can communicate via the first communication device 122, the read control module 144 transmits the input image via the first communication device 122. On the other hand, when the apparatus which is the request source is an apparatus that can communicate via the second communication device 123, the read control module 144 transmits the input image via the second communication device 123.

Next, the read control module 144 determines whether or not the medium remains on the medium tray 103 based on the medium signal received from the sensor 111 (step S211). When the medium remains on the medium tray 103, the read control module 144 returns the process to step S208 and repeats the processes in steps S208 to S211.

On the other hand, when no medium remains on the medium tray 103, the read control module 144 stops the motor 121, stops the feeding roller 112, the brake roller 113, and the first to fourth conveyance rollers 114, 115, 117 and 118 (step S212), and ends a series of steps.

Figure 7:
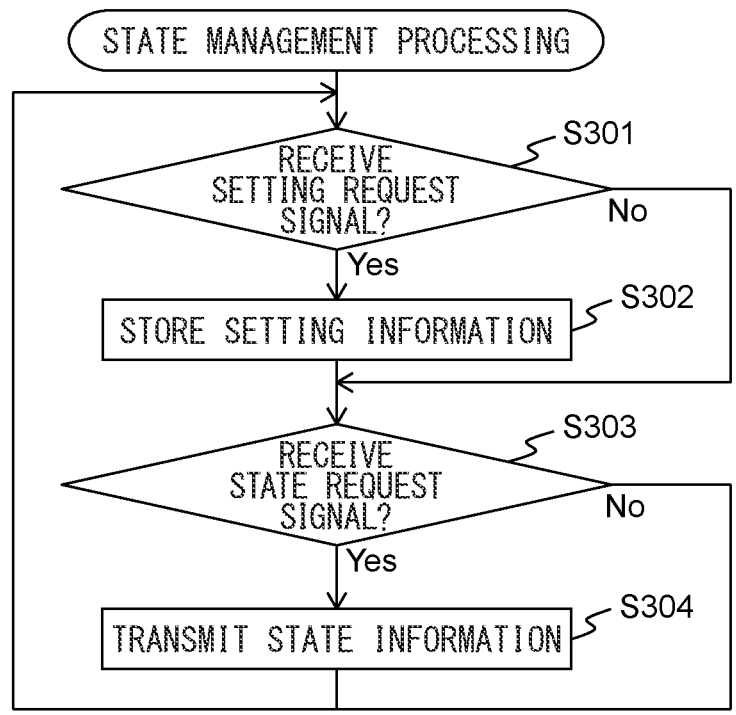
FIG. 7 is a flowchart illustrating an operation example of a condition management processing.

FIG. 7 is a flowchart illustrating an operation example of a state management processing of the image reading apparatus 100.

Referring to the flowchart illustrated in FIG. 7, the operation example of the state management processing in the image reading apparatus 100 will be described below. The flow of the operation described below is executed mainly by the processing circuit 140 in cooperation with each element of the image reading apparatus 100 based on a program stored in the storage device 130 in advance.

First, the state management module 145 determines whether or not a setting request signal for requesting the setting to the image reading apparatus 100 has been received (step S301). The read control module 144 receives the setting request signal from the server S, the first personal computer P1 or the second personal computer P2, etc., via the first communication device 122 or the second communication device 123. The setting request signal includes setting information such as a job or a user setting. The user setting includes a user ID or a password, etc. When the setting request signal has not been received, the state management module 145 proceeds the process to step S303.

On the other hand, when the setting request signal has been received, the state management module 145 stores the setting information included in the setting request signal in the storage device 130 (step S302).

Next, the state management module 145 determines whether or not a state request signal for requesting acquisition of the state of the image reading apparatus 100 has been received (step S303). The read control module 144 receives the state request signal from the server S, the first personal computer P1 or the second personal computer P2, etc., via the first communication device 122 or the second communication device 123. The state request signal includes apparatus information indicating the apparatus which is the request source (the server S, the first personal computer P1 or the second personal computer P2, etc.). When the state request signal has not been received, the state management module 145 proceeds the process to step S301.

On the other hand, when the state request signal has been received, the state management module 145 acquires the state of the image reading apparatus 100, and transmits the state information indicating the acquired state to the apparatus which is the request source via the first communication device 122 or the second communication device 123 (step S304). When the apparatus of the request source is an apparatus that can communicate via the first communication device 122, the read control module 144 transmits the state information via the first communication device 122. On the other hand, when the apparatus of the request source is an apparatus that can communicate via the second communication device 123, the read control module 144 transmits the state information via the second communication device 123. The state information indicates the total number of media readings, a history of media reading processing, etc., in the image reading apparatus 100.

In this way, the image reading apparatus 100 transmits and receives the setting information or the state information to and from any apparatus regardless of whether or not the server cooperation function is enabled and whether or not the first communication device 122 is in a state physically communicable with the network N. Thus, the user can perform maintenance of the image reading apparatus 100 using any apparatus even when the image reading apparatus 100 is operating by the server cooperation function, and the image reading apparatus 100 can improve the convenience of the user.

As described above in detail, when the server S connected through the network N is set as the transmission destination of the input image, the image reading apparatus 100 prohibits the transmission of the input image via the other communication means. When the cable for connecting to the network N is disconnected or the power of the access point is turned off, the image reading apparatus 100 automatically permits the transmission of the input image through the other communication means. Thus, the image reading apparatus 100 can appropriately manage the transmission destination of the input image.

In particular, the user can easily switch the use of an apparatus other than the server between enabled and disabled by plugging/unplugging the cable from the image reading apparatus 100 or by turning OFF/ON the power of the access point of the wireless LAN. Therefore, the image reading apparatus 100 can improve the convenience of the user.

FIG. 8 is a diagram illustrating a schematic configuration of a processing circuit 240 in an image reading apparatus according to another embodiment. The processing circuit 240 is used in place of the processing circuit 140 of the image reading apparatus 100 and executes the communication management processing, the medium read processing, the state management processing, etc., instead of the processing circuit 140. The processing circuit 240 includes a reception circuit 241, a control circuit 242, a determination circuit 243, a read control circuit 244, a state management circuit 245, etc. Note that each unit may be configured by an independent integrated circuit, a microprocessor, firmware, etc.

The reception circuit 241 is an example of a reception module, and has a function similar to the reception module 141. The receiving circuit 241 receives the setting of the transmission destination of the input image from the server S, the first personal computer P1 or the second personal computer P2, etc., via the first communication device 122 or the second communication device 123, the server S, and stores it in the storage device 130.

The control circuit 242 is an example of a control module, and has a function similar to the control module 142. The control circuit 242 reads the setting of the transmission destination of the input image from the storage device 130 and the determination result of whether or not the first communication device 122 is in a state physically communicable with the network N, sets the prohibition flag based on the read information, and stores the prohibition flag in the storage device 130.

The determination circuit 243 is an example of a determination module, and has a functions similar to the determination module 143. The determination circuit 243 acquires the state signal from the first communication device 122, determines whether or not the first communication device 122 is in a state physically communicable with the network N based on the acquired state signal, and stores the determination result in the storage device 130.

The read control circuit 244 is an example of a read control module, and has a function similar to the read control module 144. The read control circuit 244 receives the read request signal from the server S, the first personal computer P1 or the second personal computer P2, etc., via the first communication device 122 or the second communication device 123, and reads the setting of the transmission destination of the input image and the prohibition flag from the storage device 130. The read control circuit 244 determines whether or not it executes the reading of the medium based on each information read from the storage device 130. When the read control circuit 244 executes the reading of the medium, the read control circuit controls the motor 121 and the imaging device 116 based on the medium signal from the sensor 111 to acquire the input image, and transmits the input image to the apparatus which is the request source via the first communication device 122 or the second communication device 123.

The state management circuit 245 is an example of the state management module, and has a function similar to the state management module 145. The state management circuit 245 receives the setting request signal or the state request signal from the server S, the first personal computer P1 or the second personal computer P2, etc., via the first communication device 122 or the second communication device 123. The state management circuit 245 stores the setting information in the storage device 130 when the setting request signal is received, and the state management circuit 245 transmits the state information to the apparatus which is the request source via the first communication device 122 or the second communication device 123 when the state request signal is received.

As described in detail above, the image reading apparatus can appropriately manage the transmission destination of the input image even when the processing circuit 240 is used.

While preferred embodiments have been described above, embodiments are not limited to the above. For example, the control module 142 may prohibit the transmission of the input image via the second communication device 123 when the first personal computer P1 that can communicate via the first communication device 122, rather than the server S, is set as the transmission destination of the input image. In that case, the control module 142 permits the transmission of the input image via the second communication device 123 when the first personal computer P1 is set as the transmission destination of the input image and it is determined that the first communication device 122 is not in a state physically communicable with the network N. Further, the control module 142 prohibits the transmission of the input image via the second communication device 123 again when it is determined that the first communication device 122 is in a state physically communicable with the network N, thereafter.

The image reading apparatus, the control method, and the control program according to the embodiment can appropriately manage the transmission destination of the input image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
   an imaging device to generate an input image acquired by imaging a medium;
   a first communication device including a wired or a wireless communication interface circuit, provided communicatively with a first information processing apparatus;
   a second communication device including a wired or a wireless communication interface circuit, provided communicatively with a second information processing apparatus; and
   a processor to
   receive a setting for a transmission destination of the input image,
   permit transmission of the input image via the second communication device when the second information processing apparatus that can communicate via the second communication device is set as the transmission destination of the input image,
   prohibit transmission of the input image via the second communication device so that the transmission of the input image is refused when the transmission of the input image is requested by the second information processing apparatus, and
   permit transmission of state information of the image reading apparatus or reception of setting information of the image reading apparatus via the second communication device when the first information processing apparatus that can communicate via the first communication device is set as the transmission destination of the input image.

2. The image reading apparatus according to claim 1, wherein
   the processor determines whether the first communication device is in a state physically communicable with a network, and wherein
   the processor permits transmission of the input image via the second communication device when the first information processing apparatus is set as the transmission destination of the input image and it is determined that the first communication device is not in a state physically communicable with the network.

3. The image reading apparatus according to claim 2, wherein the processor prohibits transmission of the input image via the second communication device again when the first information processing apparatus is set as the transmission destination of the input image and it is determined that the first communication device is in a state physically communicable with the network after it is determined that the first communication device is not in a state physically communicable with the network.

4. The image reading apparatus according to claim 2, wherein the processor permits transmission of the state information of the image reading apparatus or reception of the setting information of the image reading apparatus via the second communication device regardless of whether it is determined that the first communication device is in a state physically communicable with the network.

5. The image reading apparatus according to claim 2, wherein
   the first communication device is connected to the network by a wired cable, and wherein
   the processor determines that the first communication device is not in a state physically communicable with the network when the wired cable is removed from the image reading apparatus.

6. The image reading apparatus according to claim 2, wherein
   the first communication device is wirelessly connected to the network, and wherein
   the processor determines that the first communication device is not in a state physically communicable with the network when wireless communication with the network is disconnected.

7. A method for controlling an image reading apparatus, comprising:
   generating an input image acquired by imaging a medium, by an imaging device;
   receiving a setting for a transmission destination of the input image;
   permitting transmission of the input image via a second communication device including a wired or a wireless communication interface circuit, provided communicatively with a second information processing apparatus when the second information processing apparatus that can communicate via the second communication device is set as the transmission destination of the input image;

prohibiting transmission of the input image via the second communication device so that the transmission of the input image is refused when the transmission of the input image is requested by the second information processing apparatus; and permitting transmission of state information of the image reading apparatus or reception of setting information of the image reading apparatus via the second communication device, when a first information processing apparatus that can communicate via a first communication device provided communicatively with the first information processing apparatus is set as the transmission destination of the input image.

8. The method according to claim 7, further comprising determining whether the first communication device is in a state physically communicable with a network, wherein transmission of the input image via the second communication device is permitted when the first information processing apparatus is set as the transmission destination of the input image and it is determined that the first communication device is not in a state physically communicable with the network.

9. The method according to claim 8, wherein transmission of the input image via the second communication device is prohibited again when the first information processing apparatus is set as the transmission destination of the input image and it is determined that the first communication device is in a state physically communicable with the network after it is determined that the first communication device is not in a state physically communicable with the network.

10. The method according to claim 8, wherein transmission of the state information of the image reading apparatus or reception of the setting information of the image reading apparatus via the second communication device is permitted regardless of whether it is determined that the first communication device is in a state physically communicable with the network.

11. The method according to claim 8, wherein the first communication device is connected to the network by a wired cable, and wherein it is determined that the first communication device is not in a state physically communicable with the network when the wired cable is removed from the image reading apparatus.

12. The method according to claim 8, wherein the first communication device is wirelessly connected to the network, and wherein it is determined that the first communication device is not in a state physically communicable with the network when wireless communication with the network is disconnected.

13. A computer-readable, non-transitory medium storing a computer program, wherein the computer program causes an image reading apparatus including an imaging device to generate an input image acquired by imaging a medium, a first communication device including a wired or a wireless communication interface circuit, provided communicatively with a first information processing apparatus, a second communication device including a wired or a wireless communication interface circuit, provided communicatively with a second information processing apparatus, to execute a process, the process comprising:

receiving a setting for a transmission destination of the input image, permitting transmission of the input image via the second communication device when the second information processing apparatus that can communicate via the second communication device is set as the transmission destination of the input image;

prohibiting transmission of the input image via the second communication device so that the transmission of the input image is refused when the transmission of the input image is requested by the second information processing apparatus; and permitting transmission of state information of the image reading apparatus or reception of setting information of the image reading apparatus via the second communication device when the first information processing apparatus that can communicate via the first communication device is set as the transmission destination of the input image.

14. The computer-readable, non-transitory medium according to claim 13, the process further comprises determining whether the first communication device is in a state physically communicable with a network, wherein transmission of the input image via the second communication device is permitted when the first information processing apparatus is set as the transmission destination of the input image and it is determined that the first communication device is not in a state physically communicable with the network.

15. The computer-readable, non-transitory medium according to claim 14, wherein transmission of the input image via the second communication device is prohibited again when the first information processing apparatus is set as the transmission destination of the input image and it is determined that the first communication device is in a state physically communicable with the network after it is determined that the first communication device is not in a state physically communicable with the network.

16. The computer-readable, non-transitory medium according to claim 14, wherein transmission of the state information of the image reading apparatus or reception of the setting information of the image reading apparatus via the second communication device is permitted regardless of whether it is determined that the first communication device is in a state physically communicable with the network.

17. The computer-readable, non-transitory medium according to claim 14, wherein the first communication device is connected to the network by a wired cable, and wherein it is determined that the first communication device is not in a state physically communicable with the network when the wired cable is removed from the image reading apparatus.

18. The computer-readable, non-transitory medium according to claim 14, wherein the first communication device is wirelessly connected to the network, and wherein it is determined that the first communication device is not in a state physically communicable with the network when wireless communication with the network is disconnected.

* * * * *